(12) United States Patent
Ito et al.

(10) Patent No.: US 7,246,518 B2
(45) Date of Patent: Jul. 24, 2007

(54) TIRE MONITORING UNIT FOR A VEHICLE

(75) Inventors: Yoshitaka Ito, Ogaki (JP); Koji Ito, Ogaki (JP)

(73) Assignee: Pacific Industrial Co., Ltd., Ogaki-Shi (JP)

( * ) Notice: Subject to any disclaimer, the term of this patent is extended or adjusted under 35 U.S.C. 154(b) by 0 days.

(21) Appl. No.: 11/258,877

(22) Filed: Oct. 27, 2005

(65) Prior Publication Data

US 2006/0162436 A1    Jul. 27, 2006

(30) Foreign Application Priority Data

Jan. 21, 2005    (JP) ............... 2005-013587

(51) Int. Cl.
*G01M 17/02* (2006.01)

(52) U.S. Cl. .................... 73/146.8; 340/442
(58) Field of Classification Search ............ 73/146, 73/146.8; 340/442; 324/174
See application file for complete search history.

(56) References Cited

U.S. PATENT DOCUMENTS

| 5,956,820 | A | * | 9/1999 | Albinski ............... 24/455 |
| 6,016,102 | A | * | 1/2000 | Fortune et al. ........ 340/442 |
| 6,055,855 | A | * | 5/2000 | Straub ................. 73/146.8 |
| 6,176,622 | B1 | * | 1/2001 | Nicot ................... 384/448 |
| 6,357,833 | B1 | * | 3/2002 | Bajer ................ 301/95.101 |
| 6,549,125 | B2 | | 4/2003 | Nigon et al. |
| 6,647,772 | B2 | * | 11/2003 | Ito et al. ............... 73/146 |
| 6,672,150 | B2 | | 1/2004 | Delaporte et al. |
| 6,694,807 | B2 | | 2/2004 | Chuang et al. |
| 6,805,000 | B1 | | 10/2004 | Sheikh-Bahaie |
| 6,924,638 | B2 | * | 8/2005 | Muramatsu et al. ..... 324/174 |
| 6,952,955 | B1 | * | 10/2005 | Uleski .................. 73/146 |
| 6,959,597 | B2 | * | 11/2005 | Ito et al. ............. 73/146.8 |

* cited by examiner

*Primary Examiner*—Edward Lefkowitz
*Assistant Examiner*—Andre J. Allen
(74) *Attorney, Agent, or Firm*—Oliff & Berridge, PLC

(57) ABSTRACT

A housing configured to accommodate a tire monitoring unit may include an extended portion, extending along a circumference of a wheel rim, and a pair of engaging members provided in parallel with the extended portion at opposite lateral sides thereof. A holder may be provided that is configured to accommodate the housing therein and to be secured to the wheel rim. The holder may include an open end portion, configured to receive therein the housing, and a holding portion configured to hold the extended portion. Also, the holder may include at least a pair of engaging portions provided in parallel with the holding portion at opposite lateral sides thereof and configured to engage with the engaging members, so that when the housing is inserted into the holder through the open end portion, with the extended portion being held in the holding portion, the engaging members are engaged with the engaging portions.

10 Claims, 6 Drawing Sheets

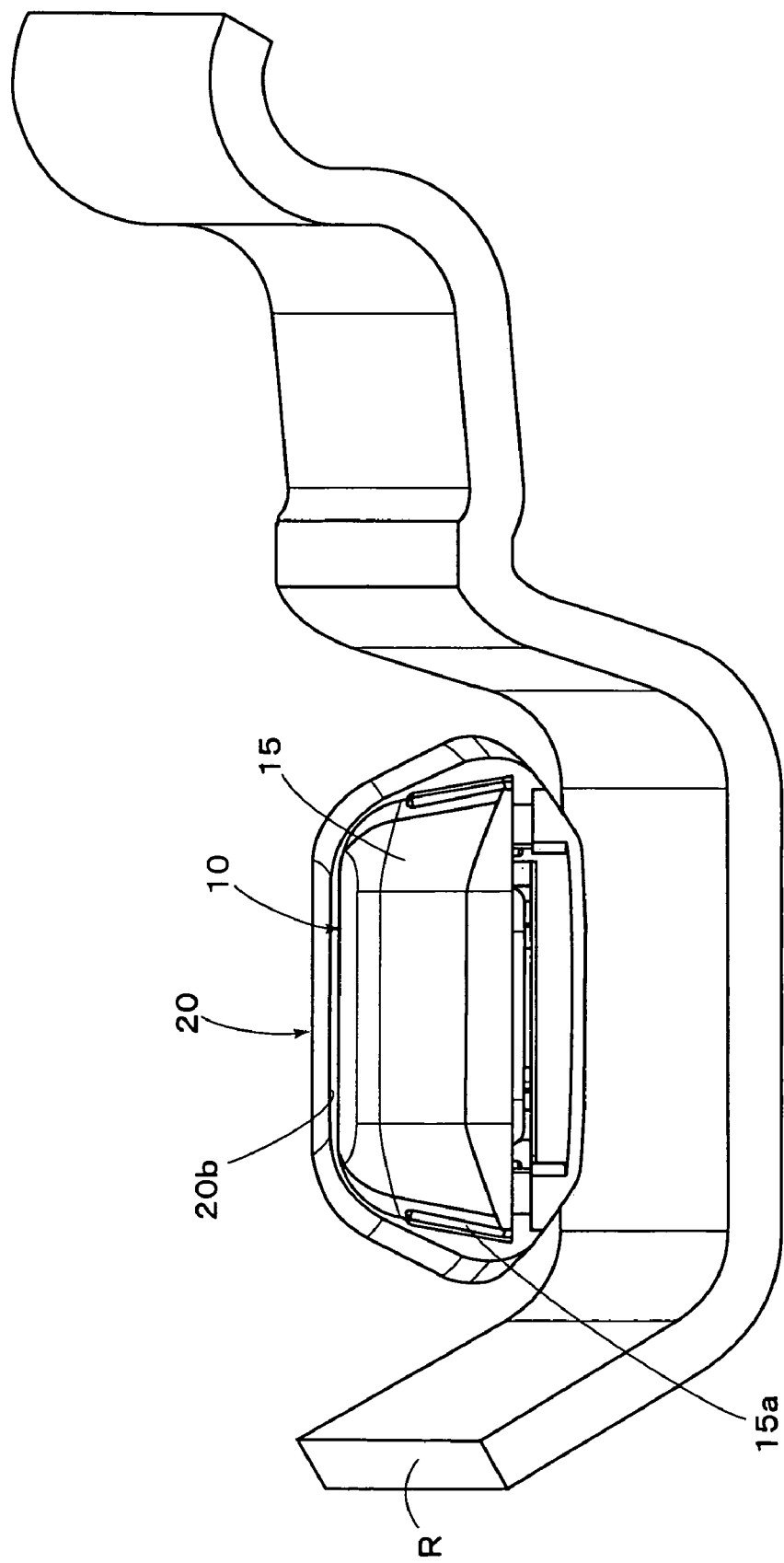

TIRE MONITORING UNIT FOR A VEHICLE

BACKGROUND

The present invention relates to a tire monitoring unit for use in an apparatus for monitoring tire conditions, and more particularly to a tire monitoring unit having a structure adapted to be appropriately mounted on a wheel rim of a vehicle.

Heretofore, there are known tire condition monitoring apparatuses capable of monitoring tire conditions, such as pneumatic pressure or the like, of a vehicle tire, and various tire monitoring units for use in those apparatuses have been proposed. Among such known apparatuses, there is known a tire monitoring unit with a transmitting function, which is provided with electronic parts, a battery, an antenna, and so on. In general, the tire monitoring unit is placed in a space between a wheel rim and a tire, and normally mounted on the rim by a pin connection or welding. In U.S. Pat. No. 6,549,125 B2, for example, a tire condition sensor unit is disclosed that is incorporated in a box placed inside a space delineated by the rim and the tire. The box is fastened to a pin permanently joined to the rim and protruding toward an inside of the tire. For example, it is disclosed that a housing box is fastened by a retainer to a stud welded to the rim.

Likewise, U.S. Pat. No. 6,672,150 B2 discloses mounting a housing for a tire pressure sensor on a wheel rim, with a body extended by a plurality of elastically deformable wings of a variable height being fixed by a snap-on attachment to a stud fixed to the rim. Various examples of mechanisms for mounting the snap-on attachment to the stud are disclosed. U.S. Pat. No. 6,694,807 B2, discloses a wheel rim having a tire sensor for a pneumatic tire, wherein a base seat is fixed on a rim portion having a valve rod, at a location other than the location of the valve rod, and a sensor is embedded in and attached to the base seat for sensing conditions of the pneumatic tire and transmitting signals. The base seat is formed with a bottom and two opposing walls spaced from each other and extending upward from the bottom. The arrangement includes hooks and flaps to hold the tire sensor at opposite sides thereof in a circumferential direction of the rim.

SUMMARY

According to the structures disclosed in U.S. Pat. Nos. 6,549,125 B2 and 6,672,150 B2, it is required to fixedly mount pins or studs on the rim, which pins or studs are not so easily secured on the rim. In U.S. Pat. Nos. 6,672,150 B2 and 6,694,807 B2, embodiments are disclosed that are capable of mounting on the rim using relatively easy means. However, such means require other members, resulting in an increase of the number of parts, and reliability of such parts might be questioned after installation.

Accordingly, exemplary embodiments of the present invention aim to provide a tire monitoring unit mounted on a wheel rim for a vehicle, with a structure for holding the unit to be mounted securely on the rim.

To accomplish this and/or other objects, a tire monitoring unit may be provided with a housing configured to accommodate the tire monitoring unit, with an extended portion provided to extend along a circumference of the wheel rim, and with at least a pair of engaging members provided substantially in parallel with the extended portion at opposite lateral sides thereof. A holder may be provided that is configured to accommodate the housing therein and to be secured to the wheel rim. The holder may include an open end portion configured to for receive therein the housing at a longitudinal end portion of the holder, and may include a holding portion configured to hold the extended portion at an other longitudinal end portion of the holder. Also, the holder may include at least a pair of engaging portions provided substantially in parallel with the holding portion at opposite lateral sides thereof, the engaging portions being configured to engage with the engaging members of the housing, so that when the housing is inserted into the holder through the open end portion, with the extended portion of the housing being held in the holding portion, the engaging members of the housing are engaged with the engaging portions of the holder.

In the tire monitoring unit described above, the holding portion may be an opening portion formed in the holder to be fitted with the extended portion. The engaging portions may be engaging openings formed on the holder, and the engaging members may include forks formed in a body with the housing to be engaged with and released from the engaging openings.

The tire monitoring unit may further include a circumferential biasing member configured to bias the housing to press the housing to the holder in a circumferential direction of the wheel rim, when the housing is mounted on the wheel rim through the holder. The extended portion of the housing may be formed with an opening opened in a radial direction of the wheel rim when the housing is mounted thereon through the holder, and the circumferential biasing member may be formed in a body with the housing, within the opening of the housing.

Alternatively or additionally, the tire monitoring unit may further include a radial biasing member configured to bias the housing to be pressed to the holder in a radial direction of the wheel rim, when the housing is mounted on the wheel rim through the holder. The radial biasing member may be formed in a body with the housing, and arranged to press the housing to the holder.

In exemplary embodiments, the housing may include an end portion extending from the open end portion outward of the holder, with the housing being held therein, and the housing may include grip portions formed on the end portion at opposite lateral sides thereof.

BRIEF DESCRIPTION OF THE DRAWINGS

Various objects and details of the following description of exemplary embodiments will become readily apparent with reference to the accompanying drawings, wherein like reference numerals denote like elements, and in which:

FIG. 8 is a perspective view of an exemplary housing to be installed in an exemplary holder, as viewed from an open end of the holder.

DETAILED DESCRIPTION OF EMBODIMENTS

Figure 1:
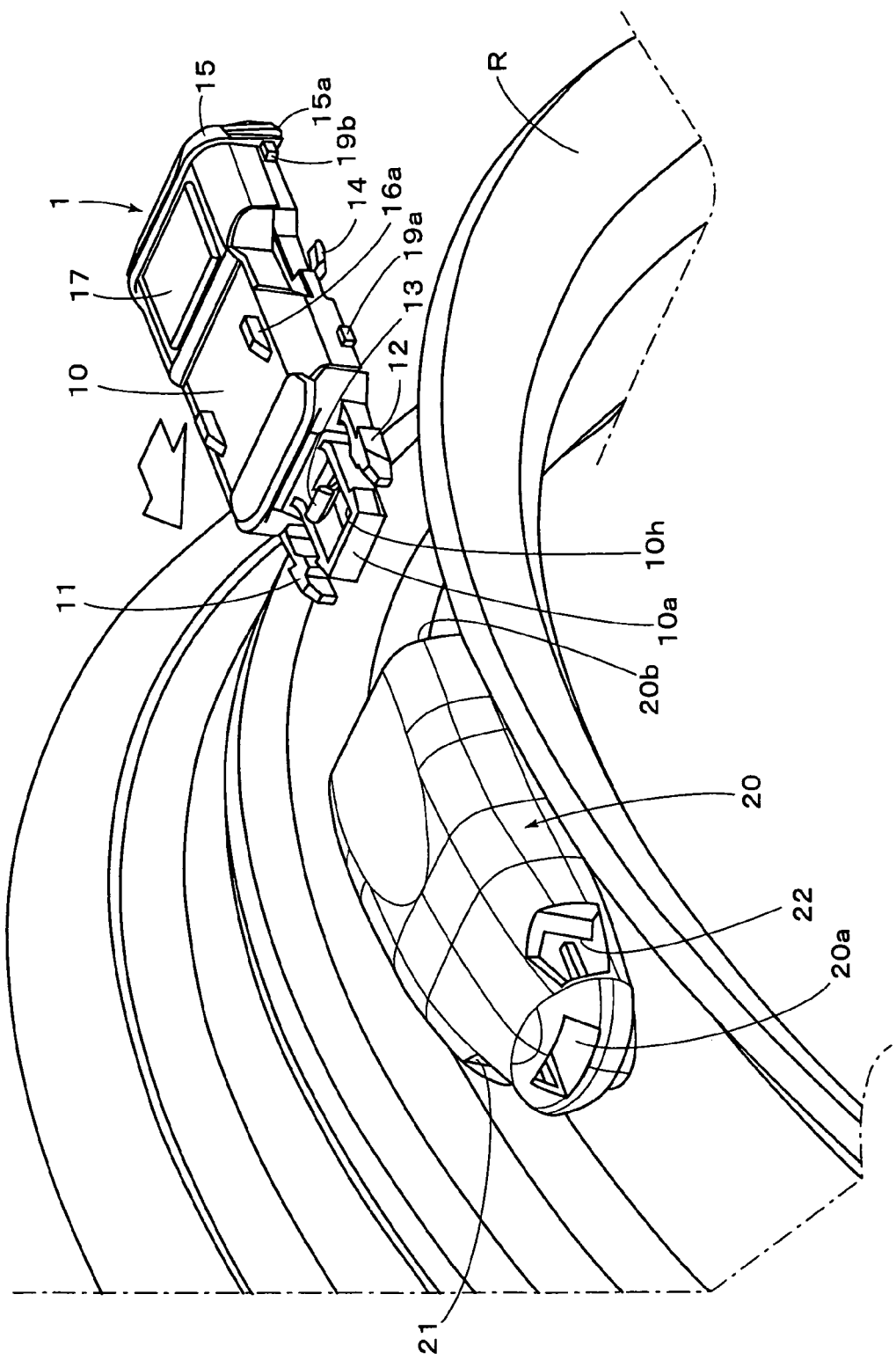
FIG. 1 is a perspective view of an exemplary tire monitoring unit mounted on a wheel rim.

Referring to FIG. 1, there is illustrated a tire monitoring unit according to an exemplary embodiment, which is used for a tire condition monitoring apparatus for monitoring tire conditions such as pneumatic pressure, temperature, or the like, within a vehicle tire. As for components of the tire monitoring unit, various electronic parts, a battery, an antenna, and so on, may be included, and a transmitting function may be provided, so that the unit may be classified as a transmitting unit. In the present embodiment, however, the tire monitoring unit is not limited to the transmitting unit, but may be one with at least a function for monitoring tire conditions. According to the exemplary embodiment shown in FIG. 1, a housing 10 is inserted into a holder 20 which is fixed to a wheel rim R for the vehicle (hereinafter, simply referred to as the rim R) as indicated by a blank arrow, so that the tire monitoring unit 1 is mounted on the rim R. Then, a tire (not shown) is fixed to the rim R, so that the tire monitoring unit 1 is accommodated within a space defined between the rim R and the tire. In FIG. 1, and FIG. 8 as referred to later, thin lines indicate portions with small radius curvatures to illustrate curved surface portions.

Figure 2:
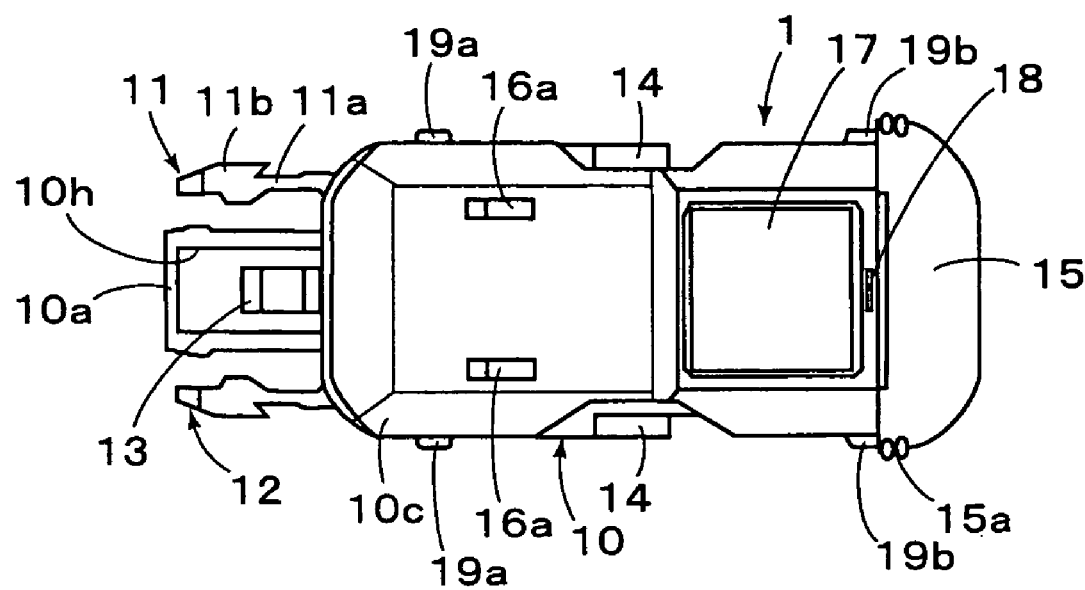
FIG. 2 is a plan view of an exemplary housing of a tire monitoring unit.
Figure 3:
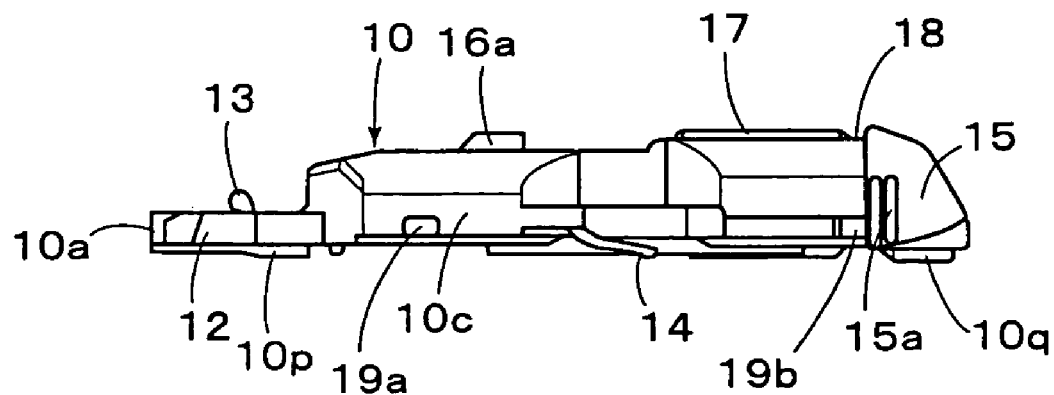
FIG. 3 is a front view of an exemplary housing of a tire monitoring unit.

The housing 10 of the tire monitoring unit 1 is made from synthetic resin to form an extended portion 10a, which extends in the circumferential direction of the rim R, as illustrated in FIGS. 2 and 3. In substantially parallel with the opposite lateral sides, extending from the extended portion 10a in a longitudinal direction thereof, a pair of engaging members 11 and 12 is formed in a body. The engaging member 11 has a pair of arm portions 11a, 11a, at each tip end of which a fork portion 11b is formed in a body, respectively, and the engaging member 12 has the same. In addition, protruding portions 10p and 10q are formed on the lower surface of the housing 10. On the upper surface of the housing 10, a pair of protruding portions 16a, 16a are formed in parallel with each other, next to which a protruding portion 17 is formed in a body. On the opposite lateral surfaces of the housing 10, a pair of guide protrusions 19a and 19b are formed in a body, respectively, to serve as appropriate guide members and hold the housing 10 in the holder 20, when the housing 10 is accommodated in the holder 20, as described herein. With respect to the components of the tire monitoring unit 1, various electronic parts, a battery BT, an antenna AT, and so on, are mounted on a circuit substrate CT, as shown in the cross-sectional view of FIG. 7, thus providing a transmitting function. As details of such features are not directly related to the present invention, further explanation thereof is omitted herein.

Figure 4:
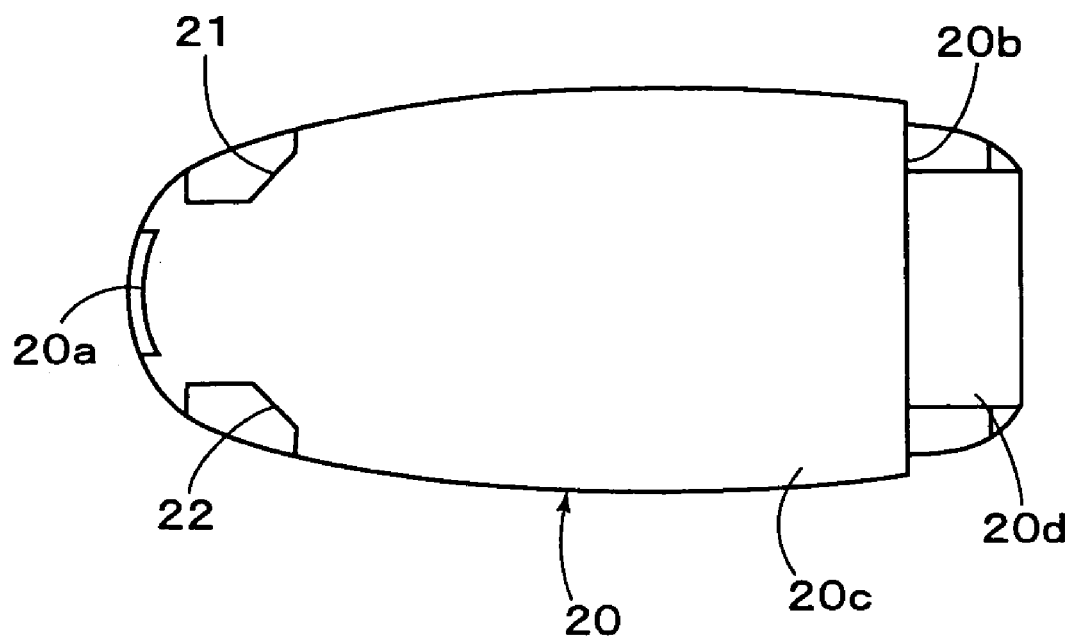
FIG. 4 is a plan view of an exemplary holder for use with such a housing.
Figure 5:
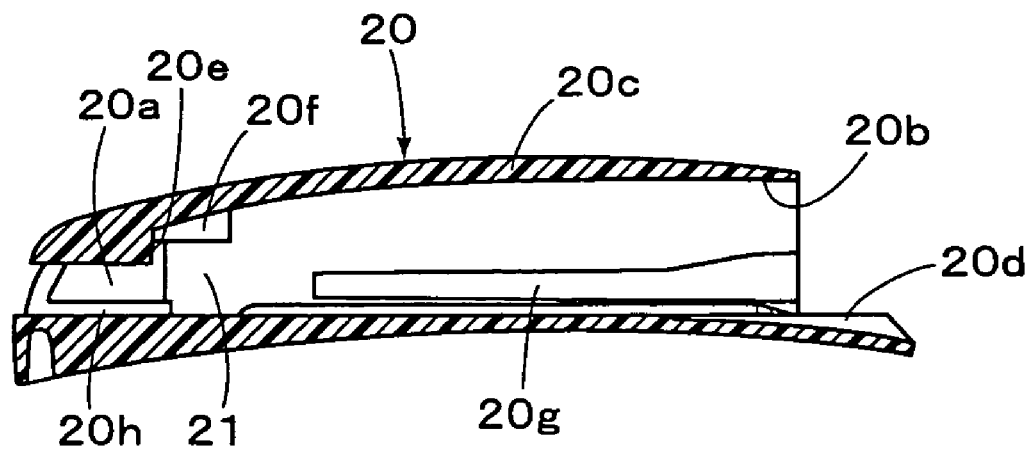
FIG. 5 is a vertical cross-sectional view of an exemplary holder for use with such a housing.

The holder 20 for holding the housing 10 is a boxlike member made from synthetic resin to be fixed on the outer circumferential surface of the rim R, as illustrated in FIGS. 4 and 5, by adhesive (not shown) or an adhesive sheet (not shown). Fixing the holder 20 on the rim R may be via a bolt, welding or the like. However, whereas the adhesive ensures a sufficient connecting force, and provides an easy mounting work, problems caused by welding or the like may be avoided. The holder 20 has an open end portion 20b for receiving therein the housing 10 at one of its longitudinal end portions, and an opening portion 20a that serves as the holding portion at the other longitudinal end portion of the holder 20. Also, the holder 20 has a pair of engaging openings 21 and 22 which are provided substantially in parallel with the open end portion 20b at opposite lateral sides thereof and configured to engage with the engaging members 11 and 12 of the housing 10, respectively, to serve as the engaging portions. Therefore, when the housing 10 is inserted into the holder 20 through the open end portion 20b, and the extended portion 10a is fitted into the opening portion 20a, then the engaging members 11 and 12 are engaged with the engaging openings 21 and 22, so that the housing 10 is held within the holder 20. Furthermore, as shown in FIG. 5, a step portion 20e is formed in a body, in the vicinity of the opening portion 20a inside of an upper wall potion 20c of the holder 20, and a stopper portion 20f is formed in a body to extend from the step portion 20e toward the open end portion 20b by a predetermined distance. On the opposite lateral surfaces inside of the holder 20, a guide groove 20g is formed with a relatively larger width at the side of the open end portion 20b, and an approximately even width at the side of the opening portion 20a. A pair of guide rails 20h, 20h are formed in parallel with each other on the lower surface inside of the tip end portion of the holder 20, to serve as appropriate guide members and hold the housing 10 in the holder 20, when using 10 is accommodated in the holder 20.

In the exemplary embodiment shown, the opening portion 20a is formed to penetrate a bottom portion of the box-like holder 20, and serves as a holding portion for holding the extended portion 10a, for the convenience of resin-forming process. Instead of the opening portion 20a, however, a recess may be formed inside of the holder 20. As for the engaging portions to be engaged with the engaging members 11 and 12, the engaging openings 21 and 22 are formed to penetrate the wall portion of the holder 20, for the convenience of resin-forming process. Instead of the engaging openings 21 and 22, however, recesses (not shown) to be engaged with the engaging openings 21 and 22, respectively. As the holder 20 is formed as shown in FIGS. 4 and 5 according to the exemplary embodiment shown, a drawing process can easily be employed in the resin-forming process, to allow rapid production at a low cost. In the case in which the rim R is washed after the holder 20 is adhered to the rim R, even if washing agent is introduced into the holder 20, the washing agent may be drained through the opening portion 20a, or the like. Therefore, the washing process can easily be employed, without any concern about the washing agent remaining inside of the holder 20. When a recess is formed in lieu of the opening portion 20a, it is desirable to additionally provide a drain hole for the holder 20.

Figure 6:
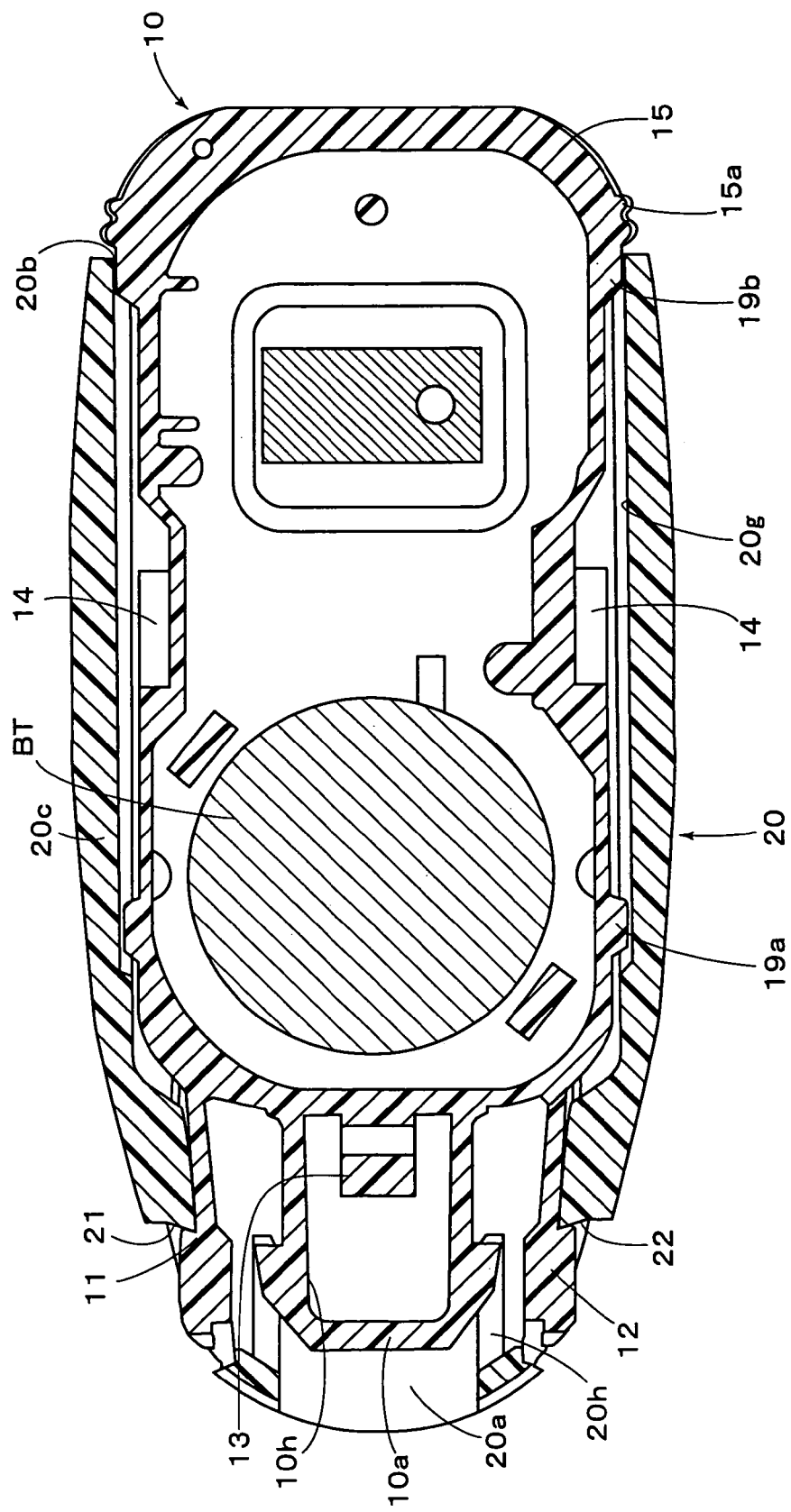
FIG. 6 is a transverse cross-sectional view of an exemplary housing to be installed in an exemplary holder.
Figure 7:
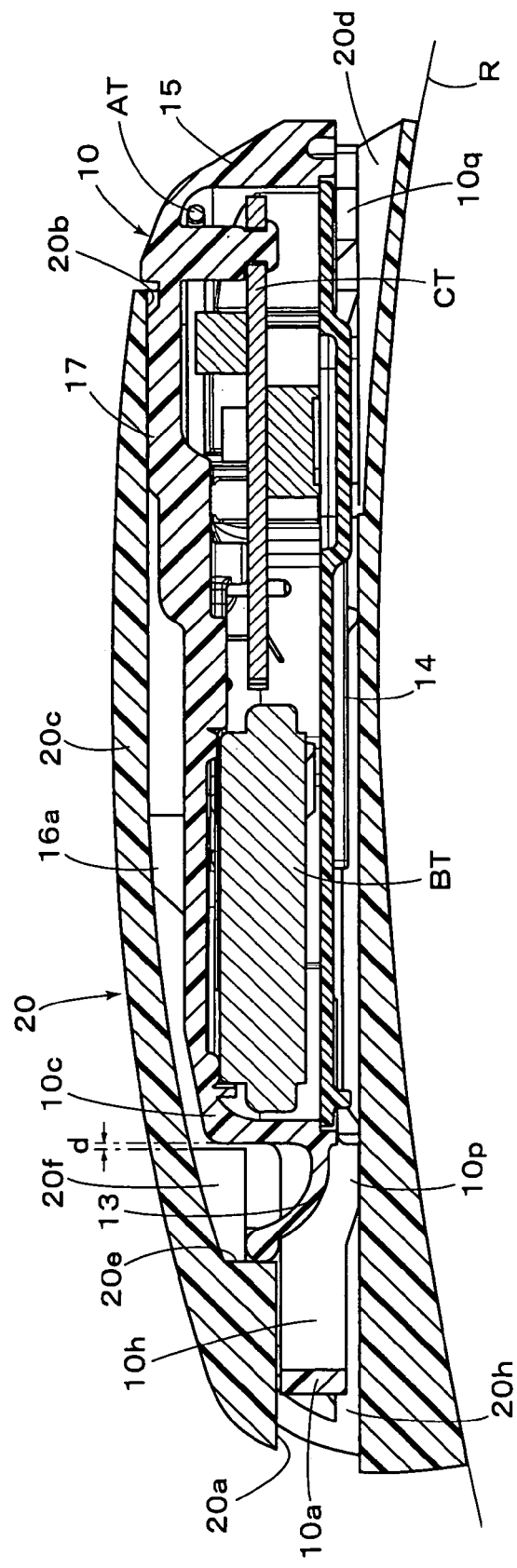
FIG. 7 is a vertical cross-sectional view of an exemplary housing to be installed in an exemplary holder, shown mounted on a wheel rim.

Furthermore, in the exemplary embodiment shown, formed on the extended portion 10a is an opening 10h, which opens in a radial direction of the rim R when the housing 10 is mounted on the rim R through the holder 20, as indicated by the blank arrow in FIG. 1. As for the circumferential biasing member for biasing the housing 10 to press the housing 10 to the holder 20 in the circumferential direction of the rim R, according to the exemplary embodiment shown, a tongue plate portion 13 with a resilient force is formed in a body with the housing 10. The tongue plate portion 13 extends into the opening 10h, as shown in FIG. 2. When the housing 10 is inserted into the holder 20 as shown in FIGS. 6 and 7, therefore, a tip end of the tongue plate portion 13 comes into contact with the step portion 20e formed inside of the upper wall potion 20c, so that the resilient force of the tongue plate portion 13 biases the housing 10 and the holder 20, with the engaging members 11 and 12 being engaged with the engaging openings 21 and 22, respectively, to keep these elements engaged. As a result, the housing 10 is held within the holder 20 in a stable state without looseness in the circumferential direction of the rim R, i.e., a horizontal direction in FIG. 7. Instead of the tongue plate portion 13, a spring or the like formed separately from the housing 10 may be provided in the opening 10h.

In addition to the foregoing, as the radial biasing member for biasing the housing 10 to press the housing 10 to the holder 20 in the radial direction of the rim R, when the housing 10 is mounted on the rim R through the holder 20, as indicated by the blank arrow in FIG. 1, according to the exemplary embodiment shown, a tongue plate portion 14 with a resilient force is formed in a body with the housing 10. The tongue plate portion 14 extends toward the rim R from a body portion 10c of the housing 10. When the housing 10 is inserted into the holder 20 as shown in FIGS. 6 and 7, therefore, a lower end of the tongue plate portion 14 comes into contact with a lower wall portion 20d, so that the resilient force of the tongue plate portion 14 biases the protruding portions 16a, 16a and the protruding portion 17 to be pressed onto the inner surface of the wall portion 20c of the holder 20. As a result, the housing 10 can easily be accommodated in the holder 20, and thereafter the housing 10 is held within the holder 20 in a stable state without looseness in the radial direction of the rim R, i.e., a vertical direction in FIG. 7. Instead of the tongue plate portion 14, a spring or the like formed separately from the housing 10 may be provided between the housing 10 and the holder 20. Also, the protruding portions 10p and 10q are formed on the lower surface of the housing 10 to be in contact with the inner surface of the wall portion 20d, so as to prevent looseness in the radial direction of the rim R, i.e., the vertical direction in FIG. 7.

An end portion 15 is formed in a body with the housing 10, and extends from the open end portion 20b of the holder 20 outward when the housing 10 being held within the holder 20. As shown in FIGS. 1-3, 6 and 8, on the end portion 15 at opposite lateral sides thereof, a plurality of protrusions 15a are formed in parallel with each other, in the radial direction of the rim R. The protrusions 15a serve as grip portions, according to the exemplary embodiment shown. As shown in FIGS. 6 and 8, the housing 10 held in the holder 20 can be drawn from the holder 20, with the protrusions 15a being gripped, after the engagement of the engaging members 11 and 12 with the engaging openings 21 and 22 is released. Also, as shown in FIGS. 2 and 3, an indicator 18, such as a recess or an adhesive label, is provided on the upper surface of the body portion 10c next to the end portion 15, so that the indicator 18 will be invisible when the housing 10 is held in the holder 20. In the case in which the indicator 18 can be observed, therefore, the indicator 18 shows that the housing 10 is not secured in the holder 20. As a result, an error in assembling the housing 10 and the holder 20 together can be avoided, so that a secure holding state can be provided.

To mount the tire monitoring unit 1 on the rim R, at the outset, the holder 20 is fixed on the outer circumferential surface of the rim R as shown in FIG. 1, by adhesive (not shown) or the adhesive sheet (not shown). Next, when the housing 10 is inserted into the holder 20, as indicated by the blank arrow in FIG. 1, the extended portion 10a of the housing 10 is guided by the guide rails 20h, 20h to be inserted into the opening portion 20a of the holder 20, and the guide protrusions 19a and 19b of the housing 10 are guided by the guide grooves 20g, 20g formed in the holder 20, so that the body portion 10c is accommodated in the holder 20. As a result, the extended portion 10a is appropriately fitted into the opening portion 20a of the holder 20, so that the engaging members 11 and 12 are securely engaged with the engaging openings 21 and 22, respectively.

Thus, the extended portion 10a is held within the opening portion 20a, with the engaging members 11 and 12 formed on opposite lateral sides of the extended portion 10a, and the engaging state of the engaging members 11 and 12 with the engaging openings 21 and 22 is reliably maintained by the resilient force of the tongue plate portion 13, so that the housing 10 is securely held in the holder 20, for example, securely enough to act against a force that may be caused when the assembly is rotated together with the rim R. Also, as shown in FIG. 6, the engaging members 11 and 12 are biased in the lateral direction of the holder 20 to be in tight contact with the inner surface of the holder 20, and the guide protrusions 19b, 19b are in tight contact with the inner surface of the holder 20, so that the housing 10 will not loose in the lateral direction, i.e., the lateral direction of the holder 20, and in parallel with the central-axis of the rim R, to be securely held within the holder 20.

As shown in FIG. 7, after the tip end portion of the tongue plate portion 13 of the housing 10 comes into contact with the step portion 20e in the holder 20, the tongue plate portion 13 is compressed to produce biasing force. When the body portion 10c of the housing 10 comes into contact with the stopper portion 20f in the holder 20, the tongue plate portion 13 will not be compressed further, so that the resilient force will not exceed a predetermined compression force. With the resilient force biasing the housing 10 toward the open end portion 20b, the housing 10 and the holder 20 are held in such a state that a predetermined clearance (d) is formed between the body portion 10c and the stopper portion 20f. Also, the protruding portions 10p and 10q are forced to be in contact with the inner surface of the wall portion 20d, so that the resilient force of the tongue plate portion 14 biases the protruding portions 16a, 16a and the protruding portion 17 to be pressed onto the inner surface of the wall portion 20c of the holder 20. Consequently, the housing 10 is held within the holder 20 in the stable state without looseness in both the circumferential direction and the radial direction of the rim R.

The holder 20 is fixed to the rim R in such a manner that the opening portion 20a is positioned rearward, i.e., leftward in FIG. 1, for example, against a rotational direction of the rim R corresponding to a forward movement of the vehicle, i.e., rightward in FIG. 1, wherein the rim R rotates in a direction opposite to the blank arrow when the vehicle moves forward. Therefore, the housing 10 is supported at the position of the opening portion 20a, to which a relatively lager force is applied in the rotational direction of the rim R when rotating at a high speed as the vehicle moves forward. Consequently, the housing 10 shall not be removed from the holder 20, and is held securely. On the other hand, when the vehicle moves backward, the housing 10 is held in the holder 20 with the engaging members 11 and 12 being engaged with the engaging openings 21 and 22, respectively, against the rotation of the rim R. As the holding force obtained by the engagement is enough to hold the housing 10 in the holder 20 against the rotation of the rim R when the vehicle moves forward and backward, the direction for mounting the holder 20 on the rim R is not so important in the exemplary embodiment shown.

As the holder 20 is box-like, and the housing 10 is accommodated in the holder 20, even if a bead portion (not shown) of the tire hits the holder 20 when the tire is mounted on the rim R, the components, such as electronic parts, held in the housing 10 will not be damaged. In the case in which the housing 10 is removed from the holder 20, the fork portion 11b of the engaging member 11, as shown in FIG. 2, is pressed inward from the outside of the engaging opening 21, and the engaging member 12 is pressed in the same manner, the engagement of the engaging members 11 and 12 with the engaging openings 21 and 22 is thus released, so that the housing 10 can be removed from the holder 20, for example, with the protrusions 15*a* being gripped.

It should be apparent to one skilled in the art that the details of the above-described embodiment are merely illustrative of but one of the many possible embodiments. Numerous and various other arrangements may be envisioned based on the foregoing description without departing from the spirit and scope of the invention.

What is claimed is:

1. A tire monitoring unit for a vehicle, comprising:
   a housing configured to accommodate the tire monitoring unit, the housing including an extended portion, provided to extend along a circumference of a wheel rim of the vehicle, and at least a pair of engaging members provided substantially in parallel with the extended portion at opposite lateral sides thereof; and
   a holder configured to accommodate the housing therein and to be secured to the wheel rim, the holder including an open end portion configured to receive therein the housing at a longitudinal end portion of the holder, and including a holding portion configured to hold the extended portion at another longitudinal end portion of the holder, and the holder including at least a pair of engaging portions provided substantially in parallel with the holding portion at opposite lateral sides thereof, the engaging portions being configured to engage with the engaging members of the housing, such that when the housing is inserted into the holder through the open end portion, with the extended portion of the housing being held in the holding portion, the engaging members of the housing are engaged with the engaging portions of the holder;
   wherein the tire monitoring unit is mounted on the wheel rim.

2. A tire monitoring unit as set forth in claim 1, wherein the holding portion comprises an opening portion formed in the holder and configured to be fitted with the extended portion.

3. A tire monitoring unit as set forth in claim 1, wherein the engaging portions comprise engaging openings formed on the holder, and wherein the engaging members include forks formed in a body with the housing and configured to be engaged with and released from the engaging openings.

4. A tire monitoring unit as set forth in claim 1, further comprising at least one circumferential biasing member configured to bias the housing to press the housing to the holder in a circumferential direction of the wheel rim, when the housing is mounted on the wheel rim through the holder.

5. A tire monitoring unit as set forth in claim 4, wherein the extended portion of the housing is formed with an opening opened in a radial direction of the wheel rim when the housing is mounted thereon through the holder, and wherein the circumferential biasing member is formed in a body with the housing, within the opening of the housing.

6. A tire monitoring unit as set forth in claim 5, wherein the circumferential biasing member includes a tongue plate portion formed in a body with the housing to extend into the opening of the housing, wherein a tip end of the tongue plate portion is in contact with a portion inside of the holder, when the housing is accommodated in the holder, to bias the housing in the circumferential direction of the wheel rim, with a resilient force of the tongue plate portion.

7. A tire monitoring unit as set forth in claim 6, wherein a clearance is formed between the housing and the holder in the circumferential direction of the wheel rim, with the resilient force of the tongue plate portion biasing the housing in the circumferential direction of the wheel rim.

8. A tire monitoring unit as set forth in claim 1, further comprising a radial biasing member configured to bias the housing to be pressed to the holder in a radial direction of the wheel rim, when the housing is mounted on the wheel rim through the holder.

9. A tire monitoring unit as set forth in claim 8, wherein the radial biasing member is formed in a body with the housing, and arranged to press the housing to the holder.

10. A tire monitoring unit as set forth in claim 1, wherein the housing includes an end portion that extends from the open end portion outward of the holder, with the housing being held therein, and the housing includes grip portions formed on the end portion at opposite lateral sides thereof.

* * * * *